US008246742B2

(12) United States Patent
Kolomiets et al.

(10) Patent No.: US 8,246,742 B2
(45) Date of Patent: Aug. 21, 2012

(54) ACCELERATOR MIXTURE AND METHOD OF USE

(75) Inventors: Elena Kolomiets, Zürich (CH); Montserrat Alfonso, Wettswil am Albis (CH); Martin Weibel, Zürich (CH)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 13/131,457

(22) PCT Filed: Dec. 3, 2009

(86) PCT No.: PCT/EP2009/066275
§ 371 (c)(1),
(2), (4) Date: Aug. 18, 2011

(87) PCT Pub. No.: WO2010/063777
PCT Pub. Date: Jun. 10, 2010

(65) Prior Publication Data
US 2012/0085266 A1    Apr. 12, 2012

(30) Foreign Application Priority Data

Dec. 4, 2008  (EP) .................................. 08170692

(51) Int. Cl.
*C04B 22/14* (2006.01)
*C04B 22/06* (2006.01)
(52) U.S. Cl. .................. 106/815; 106/286.5; 106/287.1; 106/287.17; 106/736; 106/819
(58) Field of Classification Search .................. 106/815, 106/819, 286.5, 287.1, 287.17, 736
See application file for complete search history.

(56) References Cited

U.S. PATENT DOCUMENTS

| 4,078,043 A | 3/1978 | Becher et al. |
| 6,302,954 B1 | 10/2001 | Lunkenheimer et al. |
| 6,537,367 B2 | 3/2003 | Sommer et al. |
| 7,037,369 B2 | 5/2006 | Angelskaar |
| 2006/0210716 A1 | 9/2006 | Angelskaar |
| 2010/0003412 A1 | 1/2010 | Weibel |

FOREIGN PATENT DOCUMENTS

| EP | 0 812 812 B1 | 1/2003 |
| EP | 1 167 317 B1 | 11/2003 |
| EP | 1 878 713 A1 | 1/2008 |
| JP | 2003-246659 | 9/2003 |
| JP | 2003-321263 | 11/2003 |
| KR | 960006223 B1 | 5/1996 |
| WO | WO 98/18740 | 5/1998 |
| WO | WO 03/029163 A2 | 4/2003 |
| WO | WO 03/045872 A1 | 6/2003 |
| WO | WO 2006/074739 A1 | 7/2006 |

OTHER PUBLICATIONS

Derwent-Acc-No. 1982-94600E, abstract of Soviet Union Patent Specification No. SU 893979 B (Jan. 1982).*
PCT/EP2009/066275—International Search Report, Apr. 23, 2010.
PCT/EP2009/066275—Written Opinion of the International Searching Authority, Apr. 23, 2010.
PCT/EP2009/066275—International Preliminary Report on Patentability, Jun. 7, 2011.

* cited by examiner

*Primary Examiner* — Anthony J Green
(74) *Attorney, Agent, or Firm* — Curatolo Sidoti Co., LPA; Joseph G. Curatolo; Vincent A. Cortese

(57) ABSTRACT

The invention concerns an accelerator mixture which contains aluminum in oxidation state 3, sulphate and hexafluorosilicic acid, a process for the preparation of said accelerators and the use of said accelerators for the coating of substrates with concrete or mortar. Furthermore the invention relates to concrete or mortar containing accelerators according to the invention and the hardened layers produced by applying the accelerators to concrete or mortar. The invention relates also to the use of hexafluorosilicic acid as a stabilizer.

20 Claims, No Drawings

ACCELERATOR MIXTURE AND METHOD OF USE

CROSS REFERENCE TO RELATED APPLICATIONS

This application is a national stage application of International Application No. PCT/EP2009/066275, filed 3 Dec. 2009, which claims priority from European Patent Application Serial No. 08170692.1, filed 4 Dec. 2008, from which applications priority is claimed, and which are incorporated herein by reference.

The invention relates to an accelerator, preferably for concrete or mortar, more preferably for sprayed concrete or sprayed mortar, which is present preferably as a powder composition, more preferably as an aqueous mixture as solution or as a dispersion, and contains the following:
(a) aluminium in oxidation state 3,
(b) sulphate and
(c) hexafluorosilicic acid.

The invention furthermore relates to a process for the preparation of the accelerator according to the invention, wherein aluminium sulphate and/or aluminium hydroxy sulphate, preferably aluminium sulphate and/or aluminium hydroxy sulphate and aluminium hydroxide, most preferably aluminium sulphate and aluminium hydroxide, preferably amorphous aluminium hydroxide, hexafluorosilicic acid, and optionally amines are being mixed with water. In the case of use of aluminium hydroxide the use of amorphous aluminium hydroxide is preferred. In this invention amorphous aluminium hydroxide is generally preferred compared to other forms of aluminium hydroxide, especially when compared with crystalline aluminium hydroxide.

The invention also relates to the use of the accelerator according to the invention in the coating of substrates, preferably tunnel surfaces, mine surfaces, construction trenches or shafts, with concrete or mortar, preferably sprayed concrete or sprayed mortar and the hardened layers prepared thereby, which are produced by applying concrete or mortar, preferably sprayed concrete or sprayed mortar, the hardening of which was forced with the accelerator according to the invention. The use of hexafluorosilicic acid as a stabilizer for accelerator mixtures is also part of this invention.

Concrete and mortar which is applied to substrates, such as rock surfaces of tunnels, must set and harden rapidly (especially if sprayed) so that the adhesion and mechanical strength thereof and hence the safety for humans and machines are ensured. For this reason, accelerators which ensure rapid hardening are usually added to sprayed concrete or sprayed mortar.

Accelerator solutions are described in WO 9818740, EP-A1878713, WO 03029163, EP-A 812 812, EP-A 1167317, KR-B-9606223, JP-A-2003246659 and JP-A-2003321263.

KR-B-9606223 describes the use of hexafluorosilicates (salts of hexafluorosilicic acid) in non alkali-free accelerators, which contain sodium oxide and alkali metal salts. JP-A-2003321263 discloses liquid accelerator mixtures containing hexafluorosilicates (salts of hexafluorosilicic acid) for concretes containing fly ash as a second binder. JP-A-2003246659 discloses the use of hexafluorosilicates (salts of hexafluorosilicic acid) in accelerator mixtures. The invention reduces the development of dust during spraying, the so-called rebound (a part of sprayed concrete bounces usually back from the surface to be coated) and health problems by alkaline compounds.

Conventional alkali-free setting accelerators for sprayed concrete and other cement-containing materials are distinguished in that they either result in rapid setting and relatively low early strength or lead to slow setting in combination with relatively high early strength. Furthermore the before mentioned results with respect to the performance in concrete vary often depending on the cement type. Therefore in the industry the demand for highly robust accelerator admixtures, which are suitable for a wide variety of cements on a worldwide basis, is high.

Starting from the prior art, it was the object of the present invention to develop an accelerator by means of which good early strength is permitted in combination with optimised setting time. In addition, the accelerator should have good stability of the aqueous solution or of the dispersion. Especially a precipitation of the dissolved or suspended constituents would be disadvantageous since a constant quality of the accelerators cannot be ensured under these circumstances. When insoluble material is formed it is generally difficult to rehomogenize the accelerator by for example stirring.

A further objective of the invention is to avoid the use of hydrofluoric acid (HF) in accelerator admixtures. HF is very toxic and can only be handled under very strict safety-precautions in laboratory and in production.

This object could be achieved by an accelerator mixture which contains a) aluminium in oxidation state 3, b) sulphate and c) hexafluorosilicic acid, the process for their preparation, the use thereof and the products obtainable therewith.

The accelerator mixture according to the invention may be a powder composition, a solution, dispersion or a suspension. Dispersions or solutions are particularly preferred.

The accelerator according to the invention can preferably be prepared by mixing aluminium sulphate and/or aluminium hydroxy sulphate, preferably aluminium sulphate and/or aluminium hydroxy sulphate and aluminium hydroxide, most preferably aluminium sulphate and aluminium hydroxide (preferably amorphous aluminium hydroxide), hexafluorosilicic acid, and optionally amines with water. The preparation of the accelerator mixtures is preferably effected at a temperature between 40 and 80° C., particularly preferably at a temperature between 50 and 70° C. The aluminium sulphate added to the aqueous accelerator mixture can accordingly be present partially in dispersed form and partially in dissolved form. Frequently, at least a portion of the aluminium sulphate reacts with other components of the dispersion or solution (for example with preferably amorphous aluminium hydroxide) with formation of aluminium complexes. Thus, usually at least a portion of the dissolved aluminium sulphate is present in the form of these complex structures.

Preferably the accelerators of this invention are alkali-free. The advantage of alkali-free accelerators is especially that the dust formation during spraying can be kept relatively low and there is no negative influence on health of workers due to alkaline compounds, respectively an alkaline pH.

Preferred accelerators are those which contain (d) amine in the mixture. The type of amine is not especially limited, for example it is possible to use alkylamines, aromatic amines and/or alkanolamines. Branched or not branched alkylamines are preferable.

Particularly preferably, at least one alkanolamine may be present in the mixture. Diethanolamine and/or triethanolamine are particularly preferred as the amine, especially particularly preferable is diethanolamine. Diethanolamine has the effect of promoting the stability of the accelerator compositions, especially in a combination with hexafluorosilicic acid. Also the compressive strength development is improved. Preferably the amount of amine is between 0.1 and 10%, more preferably 0.3 and 6% based in each case on the total weight of the aqueous mixture. The effect of the addition of such amines is an improvement of the compressive strength development.

Further preferred accelerators contain alkylene diamines, preferably ethylene diamine and/or dialkylene triamines, preferably diethylene triamine. Preferably the total amount of alkylene diamines, preferably ethylene diamine and/or dialkylene triamines, preferably diethylene triamine is between 0.1 and 10%, more preferably 0.3 and 6% based in each case on the total weight of the aqueous mixture. The effect of the addition of said amines is an improvement of compressive strength development.

A stabiliser (e) can be present in the accelerator mixtures according to the invention, especially preferably in aqueous accelerator admixtures. In a preferred embodiment of this invention the mixture contains magnesium silicate, clay minerals, kaolin, phosphoric acid, phosphorous acid, organic carboxylic acids and/or allophanes as a stabiliser (e).

The stabiliser can inhibit the formation of particles or prevent the sedimentation of dispersed particles of the accelerator according to the invention. Particularly preferably, the dispersion according to the invention contains the stabiliser, preferably the inorganic stabilizer, in a proportion of between 0.1 and 10% by weight, based on the total weight of the aqueous mixture. Even more preferred stabiliser contents are in the range from 0.2 to 3% by weight and especially in the range from 0.3 to 1.3% by weight, based in each case on the total weight of the accelerator mixture.

Suitable stabilisers are inorganic stabilisers, for example certain silicates, clay minerals, kaolins, allophanes and very generally inert thixotropic substances as well as phosphoric acid, phosphorous acid and/or any kind of organic carboxylic acids. An example for the organic carboxylic acids is aspartic acid.

Preferred stabilisers are magnesium silicate, clay minerals (e.g. bentonite), phosphoric acid, phosphorous acid and/or any kind of organic carboxylic acids, including salts of the before mentioned acids. Sepiolite is particularly preferred, especially particularly preferably $Si_{12}Mg_8O_{30}(OH)_4(OH_2)_4$ and/or $Mg_4Si_6O_{15}(OH)_2$.

Sepiolite is to be understood as meaning a hydrated magnesium silicate which can be defined by the empirical formula $$Si_{12}Mg_8O_{30}(OH)_4(OH_2)_4.8H_2O$$

or by $Mg_4Si_6O_{15}(OH)_2.6H_2O$.

The sepiolite is preferably composed of 2 layers of tetrahedral silica which are linked via oxygen atoms to an octahedral, discontinuous middle layer comprising magnesium atoms. This structure imparts a microfibre-like morphology to the sepiolite particles. A plurality of suitable products of inorganic stabilisers which are suitable for the present invention and comprise sepiolite are commercially available—for example "Pangel" from Tolsa. Pangel is a rheological additive which is obtained from sepiolite by loosening the fibre bundles and detaching the particles without destroying the particular, elongated shape thereof.

An example of stabilisers based on bentonite is Tixoton® from Süd-Chemie.

By definition, the inorganic stabilisers suitable for the invention are particularly preferably also to be understood as meaning products which are obtained by modification measures directly from the particularly preferred sepiolite as such, such as, for example, said "Pangel", the modification measures at least substantially retaining the elongated shape of the sepiolite particles. The modification measures meant in this context preferably relate to the loosening of sepiolite as such and measures for detaching sepiolite particles. An example of such a modification measure is the wet milling of sepiolite as such.

An accelerator which contains in aqueous mixture:
(a) preferably between 2.7 and 10% by weight,
 particularly preferably between 4 and 9% by weight and especially preferably between 5 and 8% by weight of aluminium in oxidation state 3,
(b) preferably between 12 and 34% by weight,
 particularly preferably between 14 and 34% by weight, especially preferably between 16 and 30% by weight and
 most preferably between 20 and 30% by weight of sulphate,
(c) preferably between 0.05 and 20% by weight,
 particularly preferably between 0.1 and 20% by weight, in particular between 0.2 and 15% by weight,
 especially preferably between 0.3 and 13% by weight of hexafluorosilicic acid, based in each case on the total weight of the aqueous mixture, is preferred.

An accelerator which contains in aqueous mixture:
(a) between 5 and 9% by weight of aluminium in oxidation state 3,
(b) between 16 and 30%, preferably between 18 and 30% by weight of sulphate,
(c) between 0.2 and 10% by weight, particularly preferably between 0.3 and 8% by weight of hexafluorosilicic acid, based in each case on the total weight of the aqueous mixture, is particularly preferred.

The weight data are based on the weight of the aluminium ions with respect to the aluminium, on the weight of the sulphate with respect to the sulphate and on the weight of hexafluorosilicic acid. Counterions are not taken into account in these weight data with respect to aluminium and sulphate.

It should be pointed out that the weight proportions given in this patent application refer to the aqueous admixture if not stated otherwise. Usually the solid contents of the accelerator mixtures are from about 30 weight % to 70 weight %, the rest being preferably water. Most preferably the solid content of the accelerator admixtures is from 40 to 60 weight %.

The weight percentages of the various compounds (e.g. hexafluorosilicic acid, sulphate, aluminium in oxidation state 3, amines, stabiliser . . . ) in powder compositions is calculated on the basis of the total weight of the powder composition. To simplify matters the specific weight % ranges for the powder compositions are not explicitly given in numbers, as this would lead to a lot of repetitions. It applies the simple rule that all the weight % proportions specified for the aqueous admixtures have to be multiplied by the factor 2 in order to calculate the respective value for the powder compositions (as a compensation for the water contents of the aqueous mixtures). For example an indication of "2.7 to 10 weight % by weight of aluminium in oxidation state 3 based on the total weight of the aqueous mixture" has to be read then as "5.4 to 20 weight % by weight of aluminium in oxidation state 3 based on the total weight of the powder composition".

The accelerators according to the invention with the preferred quantity data described are distinguished in that these accelerators permit the achievement of good early strength in combination with optimised (relatively short) setting times, at the same time the shelf-life being good and the production costs being advantageous.

With respect to the shelf-life of the products the presence of hexafluorosilicic acid in accelerators improves their stability especially by preventing the formation of a precipitate compared to accelerators without hexafluorosilicic acid. A precipitate is difficult to handle because a rehomogenization by for example stirring is usually very difficult. The replacement of hydrofluoric acid by hexafluorosilicic acid in the most cases improves the storage stability. Sometimes for accelerator samples according to this invention containing hexafluorosilicic acid, a phase separation with a formation of two liquid phases can take place. In such a case it is quite easy to rehomogenize the samples by simple stirring. It is important to mention that a stability improvement was observed also at high temperatures (30-40° C.), which is a temperature region where it is usually difficult to obtain stable accelerators.

The production of the accelerator mixtures is relatively convenient and safe as the handling of hexafluorosilicic acid poses much less concern with respect to environmental and safety aspects compared to hydrofluoric acid. Hexafluorosilicic acid is for example used for the fluoridation of water in several countries. It is known to be used also as a wood preservation agent. Hexafluorosilicic acid is a colorless liquid and often supplied as a 25 to 40% aqueous solution. Hexafluorosilicic acid is believed to be less toxic than hydrofluoric acid and has to be treated only with the usual safety precautions in the laboratory and production. When working with hexafluorosilicic acid it is usually not necessary to apply extreme safety precautions (for example special mask with filters, ventilation and protective overall) like in the case of HF.

The effect of hexafluorosilicic acid in cementitious compositions is especially that good compressive strength results can be obtained (also compared to HF) and that at the same time shorter setting times compared to compositions with hydrofluoric acid can be obtained. Also the stability against separation of the accelerator admixtures improves if hexafluorosilicic acid is contained.

The broad range of different cements which give good mortar results with this accelerator is an especially important advantage of this invention. These are not only cements which are relatively easy to accelerate and for which satisfactory results are also achieved with conventional accelerators. They are in particular also particularly sluggish or incompatible cements for which no sufficiently effective accelerators have been known to date.

The accelerators according to the invention, which are present preferably as a powder composition, more preferably as an aqueous mixture as solution or as dispersion, contain aluminium in the oxidation state 3, sulphate and hexafluorosilicic acid. This combination of ingredients provides for short setting times and a good strength development during hardening compared to accelerator admixtures containing no hexafluorosilicic acid.

With the accelerator according to the invention, it is now possible to achieve rapid setting together with a markedly high early strength (e.g. 6 hours after spraying).

A preferred accelerator is one which contains in aqueous mixture, in addition to (a), (b) and (c):
(d) between 0.1 and 10% by weight,
preferably between 0.3 and 6% by weight,
especially preferably between 0.4 and 4.5% by weight, of amine, preferably alkanolamine, particularly preferably diethanolamine and/or triethanolamine, most preferably diethanolamine,
based in each case on the total weight of the aqueous mixture.

The accelerators according to the invention preferably have a proportion of hexafluorosilicic acid of between 0.05 and 10% by weight, preferably between 0.1 and 10% by weight, particularly preferably between 0.2 and 8% by, preferably between 0.3 and 8% by weight, based in each case on the total weight of the aqueous mixture.

The mixture may be present preferably as a dispersion or solution. Among dispersions those dispersions, which contain a stabilizer are preferred.

The present invention also relates to a process for the preparation of an accelerator, preferably for concrete or mortar, more preferably for sprayed concrete or sprayed mortar, which is present as an aqueous mixture, characterized in that aluminium sulphate and/or aluminium hydroxy sulphate, preferably aluminium sulphate and/or aluminium hydroxy sulphate and aluminium hydroxide, most preferably aluminium sulphate and aluminium hydroxide (preferably amorphous aluminium hydroxide), hexafluorosilicic acid, and optionally amines are mixed with water. In particular, the initially described accelerator mixtures according to the invention are prepared by the process according to the invention.

The process according to the invention can preferably be carried out by a procedure in which
between 17 and 37% by weight, particularly preferably between 22 and 36% by weight, of aluminium sulphate,
between 0 and 15% by weight, particularly preferably between 0.1 and 14% by weight, of preferably amorphous aluminium hydroxide,
between 0.1 and 10% by weight, particularly preferably between 0.4 and 4.5% by weight, of alkanolamine, particularly preferably diethanolamine,
between 0.05 and 20% by weight, preferably 0.1 and 20% by weight, particularly preferably between 0.2 and 8% by weight, of hexafluorosilicic acid are mixed with water, the weight data being based on the total weight of the liquid accelerator.

During preparation and during storage, the accelerators according to the invention preferably show a pH of between 0 and 5, most preferably a pH between 2 and 3.6. The various components can preferably be added with vigorous stirring to the initially introduced water or an initially introduced solution of one of the accelerator components. In order to obtain solutions, the procedure is preferably carried out with heating of the mixtures. Heating and also subsequent cooling is not absolutely essential, with the result that energy costs can be saved and the preparation is simplified. However, heating to temperatures between 40 and 80° C. advantageously reduces the preparation time and therefore increases the productivity of the production plant.

The invention furthermore relates to the use of the accelerator described above in the coating of substrates with concrete or mortar, preferably with sprayed concrete or sprayed mortar in particular tunnel surfaces, mine surfaces, construction trenches and shafts.

The invention furthermore relates to the use of hexafluorosilicic acid as a stabilizer for accelerator mixtures, preferably for accelerator mixtures, which contain aluminium in the oxidation state 3 and sulphate. The invention furthermore relates to the use of hexafluorosilicic acid as a stabilizer for accelerator mixtures, which contain aluminium in the oxidation state 3, sulphate and further stabilizers. The amount of hexafluorosilicic acid useful to stabilize the accelerator mixtures is preferably between 0.05 and 10% by weight, based on the total weight of the aqueous mixture. Even more preferred stabiliser contents are in the range from 0.1 to 3% by weight and especially in the range from 0.2 to 1.3% by weight.

Typically, from 5 to 10 kg of the accelerator according to the invention are used at the construction site per 100 kg of cement.

The invention also relates to concrete or mortar, preferably sprayed concrete or sprayed mortar, containing an accelerator according to this invention.

The invention furthermore relates to a hardened layer of concrete or mortar which was produced by applying concrete or mortar, preferably sprayed concrete or sprayed mortar, the hardening of which was forced with an accelerator described above.

In this invention the terms concrete and mortar, respectively sprayed concrete and sprayed mortar, may also comprise other cementitious materials. For example cement based grouts for mining and cementitious mortars for fire protection of concrete.

EXAMPLES

Below, the present invention is to be explained in more detail with reference to working examples.

Examples of accelerators according to the invention were prepared as follows: The required amount of cold water and stabilizer (if necessary) was placed in a beaker on an electrical hotplate and vigorously stirred with a propeller stirrer. During the heating, first aluminium sulphate, then hexafluorosilicic acid, amorphous aluminium hydroxide and finally diethanolamine were added. The water content of the raw materials used was taken into account in calculating the water required at the beginning. After reaching 60° C., the accelerator was stirred for a further one to two hours at this temperature and then cooled to room temperature for several hours with continued stirring. The sequence of addition of the raw materials can influence the duration of stirring which is required in order to obtain a homogeneous product, but has no influence on the properties of the completely reacted and correctly stirred accelerator. It is also possible to prepare accelerators without heating, but the preparation time will be increased.

In the examples the following raw materials were used:
Water,
Aluminium sulphate (a and b)
  (as $Al_2(SO_4)_3 \cdot 14.8\, H_2O$; this corresponds to an aluminium sulfate content of 56.2 weight %),
Amorphous aluminium hydroxide (a): 75±2% $Al(OH)_3$,
Hexafluorosilicic acid (c): 34% aqueous solution,
Diethanolamine (d): 90%,
Pangel S9 (stabilizer (e)),
Hydrofluoric acid: 40% aqueous solution,
Magnesium hexafluorosilicate: magnesium hexafluorosilicate hexahydrate tech., min. 99%.

1. Accelerator Compositions (Table 1-1)

The invention is now further described with reference to the accelerators according to the invention and the comparative examples. The composition of all tested formulations and storage stability data at different temperatures are presented in table 1-1. Additionally stability data for some further formulations are given in table 1-2. The examples of accelerators according to the invention (I) contain hexafluorosilicic acid and comparative examples (C) do not contain this product. All parts in tables 1-1 and 1-2 are expressed by weight.

2. Test Systems (Mortar and Concrete)

2.1 Mortar Test Systems Table 2)

Table 2 shows mortar compositions with different cements, which were used as test systems for the accelerators of table 1-1.

2.2. Concrete Test Systems (Table 3)

The concrete compositions used for the concrete test of the accelerators are presented in table 3.

3. Accelerator Test Methods 3.1 Test Methods in Mortar

The accelerators according to the invention and the comparative examples were tested with regard to the setting time and the compressive strength with mortar according to DIN EN 196-1 and -3. The results are summarized in tables 4 to 7.

3.2 Test Methods in Concrete

Sprayed concrete tests were performed with the accelerators according to the invention and the comparative examples with regard to the compressive strength development according to EFNARC European Specification for Sprayed Concrete 1999. The results are summarized in table 8.

5. Accelerator Test Results 5.1 Accelerator Test Results in Mortar (Tables 4 to 7)

Tables 4 to 7 summarize the performance results in mortar of the accelerators according to the invention and the comparative examples with different cements.

In the examples according to the invention E-1 to E-3 of table 4 a significant improvement of setting times and at the same time satisfactory strength development is observed for the mortar system M-1, when compared to the comparative examples E-7 to E-9 (without hexafluorosilicic acid).

The examples E-4 to E-6 according to the invention, show the same effect of hexafluorosilicic acid for various other cements, when compared to the comparative examples E-10 to E-12 (without hexafluorosilicic acid).

In table 5 in the examples E-13 to E-15 a significant improvement of setting times and compressive strength development at 6 h and 1d (especially for examples E-14 and E-15) is observed, when compared to the comparative examples E-21 to E-23 (without hexafluorosilicic acid). In the examples E-16 to E-20 according to the invention, a significant improvement of setting times and at the same time satisfactory strength development is observed for different cements, when compared to the comparative examples E-24 to E-28 (without hexafluorosilicic acid).

In table 6 in examples E-29 to E-31 the improvement of the initial and final setting time is more significant than the decrease in compressive strength compared to the example E-34, which is not according to the invention.

In examples E-32 and E-33 a significant improvement of setting times and at the same time satisfactory strength development is observed for two different types of cement, when compared to the comparative examples E-35 and E-36 (without hexafluorosilicic acid).

Examples E-37 (without diethanolamine) and E-38 (with diethanolamine) demonstrate the effect of diethanolamine in the formulations according to the invention. An improvement of the compressive strength development is observed.

The examples of table 7 show an advantage of hexafluorosilicic acid compared to the magnesium salt of hexafluorosilicic acid and hydrofluoric acid.

In the examples E-39 and E-48 as well as E-40 and E-49, the amount of hexafluorosilicic species (calculated as $[SiF_6]^{2-}$) in the formulations is the same, whereas the source of the hexafluorosilicate species is different. In E-39 and E-40 the source is hexafluorosilicic acid ($H_2SiF_6$) and in E-48 and E-49 it is the magnesium salt of hexafluorosilicic acid (magnesium hexafluorosilicate ($MgSiF_6$)).

From comparison of the examples E-39 and E-48, as well as E-40 and E-49, it follows that the use of hexafluorosilicic acid results in shorter setting times and better compressive strength development compared to the magnesium salt of hexafluorosilicic acid.

The effect of hexafluorosilicic acid is shown in the examples E-41 to E-47 (with hexafluorosilicic acid) in comparison to the hydrofluoric acid containing examples E-50 to E-56.

These examples show that hexafluorosilicic acid has a positive effect on the setting times and compressive strength at 6 h and 1d compared to the examples with hydrofluoric acid. A significant improvement of compressive strength at 6 h is observed for the examples E-41 to E-43 and E-45 (with hexafluorosilicic acid), when compared to the comparative examples E-50 to E-52 and E-54 (with hydrofluoric acid).

5.2 Accelerator Test Results in Concrete (Table 8)

Table 8 shows the results of sprayed concrete tests.

In the concrete spraying experiments a significant improvement of compressive strength development after 6, 15 min and 1, 4 and 24 hours was observed for the example E-57 according to the invention, when compared to the comparative example E-58 (without hexafluorosilicic acid).

The stability data in table 1-1 were measured at temperatures from 5 to 40° C. 80 ml of accelerator solution with a filling height of 55 mm were stored in a glass receptacle and the stability was observed. The results show that hexafluorosilicic acid in accelerators improves their stability compared to accelerators without hexafluorosilicic acid. In addition, the replacement of hydrofluoric acid by hexafluorosilicic acid in the most cases improves the storage stability. It is important to mention that a stability improvement was observed also at 40° C. where it is usually difficult to obtain stable accelerators. Some additional stability data are given in table 1-2. Those data show that hexafluorosilicic acid improves the stability of the accelerators significantly.

Two layers (symbol X) in table 1-1 means that two liquid phases were formed. This is a less severe case of separation. Inhomogeneous samples are usually not desired, but as mentioned before the two phases can easily rehomogenized by stirring.

In conclusion, examples of accelerators according to the invention with hexafluorosilicic acid prove a positive effect of this new compound on setting times and simultaneously an improvement of strength development for different cements. Such effect of hexafluorosilicic acid was observed both for mortar and sprayed concrete tests.

TABLE 1-1

| Formulation | Water | Aluminum sulphate, 56.2% | Aluminum hydroxide amorphous, 75 ± 2 | Hexafluoro-silicic acid, 34% | Diethanol-amine, 90% | Pangel S9 | Hydrofluoric acid, 40% | Magnesium hexafluoro-silicate, 99% | Stability after 1 month at 5° C. | Stability after 1 month at 40° C. |
|---|---|---|---|---|---|---|---|---|---|---|
| F-1(I) | 32 | 63 | — | 5 | — | — | — | — | X | X |
| F-2(I) | 43 | 42 | 12 | 3 | — | — | — | — | ○ | ○ |
| F-3(I) | 43.5 | 42 | 13 | 1 | 0.5 | — | — | — | X | X |
| F-4(I) | 42.5 | 42 | 12 | 3 | 0.5 | — | — | — | ○ | Δ |
| F-5(I) | 46 | 38 | 12 | 3 | 1 | — | — | — | X | X |
| F-6(I) | 43 | 40 | 12 | 3 | 2 | — | — | — | X | Δ |
| F-7(I) | 27.2 | 63 | 4 | 1 | 4 | 0.8 | — | — | * | * |
| F-8(I) | 26.2 | 63 | 4 | 2 | 4 | 0.8 | — | — | * | * |
| F-9(I) | 24.2 | 63 | 4 | 4 | 4 | 0.8 | — | — | * | * |
| F-10(I) | 22.2 | 63 | 4 | 6 | 4 | 0.8 | — | — | * | * |
| F-11(I) | 36 | 42 | 17 | 5 | — | — | — | — | ○ | Δ |
| F-12(I) | 35.5 | 42 | 17 | 5 | 0.5 | — | — | — | ○ | Δ |
| F-13(I) | 35.8 | 44 | 15.2 | 3 | 2 | — | — | — | ○ | X |
| F-14(I) | 43 | 45 | 9 | 3 | — | — | — | — | X | X |
| F-15(I) | 41 | 45 | 9 | 5 | — | — | — | — | ○ | X |
| F-16(I) | 44 | 40 | 9 | 7 | — | — | — | — | X | X |
| F-17(I) | 48 | 40 | 9 | 3 | — | — | — | — | X | X |
| F-18(I) | 42 | 40 | 9 | 9 | — | — | — | — | X | X |
| F-1(C) | 37 | 63 | — | — | — | — | — | — | XX | X |
| F-2(C) | 46 | 42 | 12 | — | — | — | — | — | XX | Δ |
| F-3(C) | 44.5 | 42 | 13 | — | 0.5 | — | — | — | XX | ‡ |
| F-4(C) | 45.5 | 42 | 12 | — | 0.5 | — | — | — | XX | Δ |
| F-5(C) | 49 | 38 | 12 | — | 1 | — | — | — | X | XX |
| F-6(C) | 46 | 40 | 12 | — | 2 | — | — | — | XX | XX |
| F-7(C) | 28.2 | 63 | 4 | — | 4 | 0.8 | — | — | * | * |
| F-8(C) | 43.5 | 42 | 12 | — | 0.5 | — | — | 2 | Δ | XX |
| F-9(C) | 36.8 | 44 | 15.2 | — | 2 | — | — | 2 | ○ | ‡ |
| F-10(C) | 43 | 45 | 9 | — | — | — | 3 | — | XX | ‡ |
| F-11(C) | 41 | 45 | 9 | — | — | — | 5 | — | ○ | ‡ |
| F-12(C) | 44 | 40 | 9 | — | — | — | 7 | — | ○ | XX |
| F-13(C) | 48 | 40 | 9 | — | — | — | 3 | — | X | ‡ |
| F-14(C) | 42 | 40 | 9 | — | — | — | 9 | — | ○ | ‡ |

* suspensions remain stable
○ precipitated layer < 1 mm
Δ precipitated layer < 5 mm
‡ precipitated layer < 25 mm
X layer separation
XX high viscous or solid

TABLE 1-2

| Formulation | Water | Aluminum sulphate, 56.2% | Aluminum hydroxide amorphous, 75 ± 2% | Hexafluoro-silicic acid, 34% | Diethanol-amine, 90% | Precipitation (vol. %) after 1 week at 20° C. | Precipitation (vol. %) after 2 week at 20° C. | Precipitation (vol. %) after 4 week at 20° C. |
|---|---|---|---|---|---|---|---|---|
| F-19(I) | 49 | 40 | 10 | 1 | — | 2 | 5 | 15 |
| F-20(I) | 47 | 40 | 10 | 1 | 2 | — | 2 | 7 |
| F-21(I) | 45 | 40 | 10 | 1 | 4 | — | 1 | 7 |
| F-22(I) | 45 | 40 | 14 | 1 | — | — | 8 | 10 |
| F-23(I) | 43 | 40 | 14 | 1 | 2 | — | — | 8 |
| F-24(I) | 41 | 40 | 14 | 1 | 4 | — | — | 5 |
| F-15(C) | 50 | 40 | 10 | — | — | 5 | 10 | 30 |
| F-16(C) | 48 | 40 | 10 | — | 2 | 2 | 5 | 15 |
| F-17(C) | 46 | 40 | 10 | — | 4 | 2 | 5 | 15 |
| F-18(C) | 46 | 40 | 14 | — | — | — | 6 | 15 |
| F-19(C) | 44 | 40 | 14 | — | 2 | — | 2 | 12 |
| F-20(C) | 42 | 40 | 14 | — | 4 | — | 1 | 3 |

The given values "precipitation (vol. %)" after the respective time represent an estimation of the precipitated volume. Values below 5 are to be considered as a virtually stable dispersion.

TABLE 2

| | Mortar/Composition | M-1 | M-2 | M-3 | M-4 | M-5 | M-6 | M-7 |
|---|---|---|---|---|---|---|---|---|
| Cement: | CEM I 42.5 Normo 4 Untervaz (Switzerland) | 450 g | | | | | | |
| | CEM I 42.5 R Radotin (Czech Republic) | | 450 g | | | | | |
| | CEM I 42.5 R Mokra (Czech Republic) | | | 450 g | | | | |
| | CEM I 42.5 RR Norcem (Norway) | | | | 450 g | | | |
| | CEM II/A-LL 42.5 R Byggcement (Sweden) | | | | | 450 g | | |
| | CEM II/A-LL 42.5 R Pederobba (Italy) | | | | | | 450 g | |
| | CEM II/A-V 42.5 R Norcem (Norway) | | | | | | | 450 g |
| Sand: | CEN Normsand | 1350 g | 1350 g | 1350 g | 1350 g | 1350 g | 1350 g | 1350 g |
| *Superplasticiser: | Glenium ® 51 | 0.30% | 0.20% | 0.30% | 0.30% | 0.20% | 0.20% | 0.20% |
| Water/Cement Ratio: | | 0.45 | 0.45 | 0.45 | 0.45 | 0.45 | 0.45 | 0.45 |

*The dosage of superplasticiser was calculated with respect to the amount of cement in the mortar.

TABLE 3

| | Concrete/Composition | Con-1 |
|---|---|---|
| Cement: | CEM I 42.5 Normo 4 Untervaz | 450 kg |
| Sand: | Sand Type A 0-4 mm | 1246 kg |
| | Sand Type B 4-8 mm | 534 kg |
| #Superplasticiser: | Glenium ® 51 | 0.70% |
| #Stabilizer: | Delvo ® Crete Stabiliser 10 | 0.20% |
| Water/Cement Ratio: | | 0.44 |

The dosage of superplasticiser and stabilizer was calculated with respect to the amount of cement in the concrete.

TABLE 4

| Examples | E-1 | E-2 | E-3 | E-4 | E-5 | E-6 | E-7 | E-8 | E-9 | E-10 | E-11 | E-12 |
|---|---|---|---|---|---|---|---|---|---|---|---|---|
| Formulation/ | F-1(I) | F-2(I) | F-3(I) | F-2(I) | F-2(I) | F-2(I) | F-1(C) | F-2(C) | F-3(C) | F-2(C) | F-2(C) | F-2(C) |
| Mortar | M-1 | M-1 | M-1 | M-5 | M-6 | M-7 | M-1 | M-1 | M-1 | M-5 | M-6 | M-7 |
| Initial set (minutes) | 4 | 3 | 6.5 | 2.5 | 2 | 1.5 | 8 | 10 | 12 | 8.5 | 4 | 4.5 |
| Final set (minutes) | 27 | 15 | 18 | 10.5 | 11 | 15 | 33 | 44 | 38 | 17 | 17 | 21 |
| Compressive strength at 6 h (MPa) | 1.1 | 1.8 | 2.3 | 2.2 | 2.2 | 2.3 | 1.3 | 2 | 2 | 1.6 | 2.7 | 2.9 |
| Compressive strength at 1 d (MPa) | 23.5 | 13.3 | 13.1 | 21.4 | 21 | 14.2 | 18.9 | 14.5 | 12.8 | 21.4 | 21.7 | 16 |

TABLE 4-continued

| Examples | E-1 | E-2 | E-3 | E-4 | E-5 | E-6 | E-7 | E-8 | E-9 | E-10 | E-11 | E-12 |
|---|---|---|---|---|---|---|---|---|---|---|---|---|
| Compressive strength at 7 d (MPa) | 46.5 | 40.4 | 44.2 | 40.8 | 46.7 | 33.6 | 43.1 | 41.6 | 43.9 | 40.6 | 46.7 | 34.5 |
| Dosage, % ** | 8 | 8 | 8 | 8 | 8 | 8 | 8 | 8 | 8 | 8 | 8 | 8 |

TABLE 5

| Examples | E-13 | E-14 | E-15 | E-16 | E-17 | E-18 | E-19 | E-20 | E-21 |
|---|---|---|---|---|---|---|---|---|---|
| Formulation/ | F-4(I) | F-5(I) | F-6(I) | F-4(I) | F-5(I) | F-6(I) | F-4(I) | F-6(I) | F-4(C) |
| Mortar | M-1 | M-1 | M-1 | M-6 | M-6 | M-6 | M-5 | M-5 | M-1 |
| Initial set (minutes) | 3 | 5 | 4 | 2.5 | 3 | 3 | 2.5 | 2.5 | 11 |
| Final set (minutes) | 14 | 25 | 10.5 | 11.5 | 15 | 12.5 | 10 | 11.5 | 39.5 |
| Compressive strength at 6 h (MPa) | 2 | 2.4 | 2.7 | 3.3 | 3.5 | 2 | 2 | 2.2 | 2.1 |
| Compressive strength at 1 d (MPa) | 13.9 | 22.9 | 21.9 | 24.2 | 24.7 | 23.6 | 18.8 | 22.7 | 14.9 |
| Compressive strength at 7 d (MPa) | 41.9 | 46.8 | 45.4 | 53.6 | 52.8 | 49.8 | 38.6 | 38.3 | 41.9 |
| Dosage, % ** | 8 | 8 | 8 | 8 | 8 | 8 | 8 | 8 | 8 |

| Examples | E-22 | E-23 | E-24 | E-25 | E-26 | E-27 | E-28 |
|---|---|---|---|---|---|---|---|
| Formulation/ | F-5(C) | F-6(C) | F-4(C) | F-5(C) | F-6(C) | F-4(C) | F-6(C) |
| Mortar | M-1 | M-1 | M-6 | M-6 | M-6 | M-5 | M-5 |
| Initial set (minutes) | 12 | 10.5 | 5 | 5 | 5 | 4 | 5 |
| Final set (minutes) | 33 | 29 | 22.5 | 22.5 | 18.5 | 16 | 15 |
| Compressive strength at 6 h (MPa) | 1.5 | 1.7 | 4.1 | 3.9 | 3.3 | 2.6 | 2.9 |
| Compressive strength at 1 d (MPa) | 9.7 | 5.4 | 26.2 | 26.3 | 25.9 | 24.3 | 25.2 |
| Compressive strength at 7 d (MPa) | 44.6 | 44.1 | 53.6 | 39.3 | 51.6 | 40.3 | 41 |
| Dosage, % ** | 8 | 8 | 8 | 8 | 8 | 8 | 8 |

TABLE 6

| Examples | E-29 | E-30 | E-31 | E-32 | E-33 | E-34 | E-35 | E-36 | E-37 | E-38 |
|---|---|---|---|---|---|---|---|---|---|---|
| Formulation/ | F-7(I) | F-8(I) | F-10(I) | F-8(I) | F-9(I) | F-7(C) | F-7(C) | F-7(C) | F-11(I) | F-12(I) |
| Mortar | M-1 | M-1 | M-1 | M-2 | M-5 | M-1 | M-2 | M-5 | M-1 | M-1 |
| Initial set (minutes) | 4 | 3.5 | 1.5 | 1.5 | 2 | 5.5 | 1.5 | 4 | 2 | 2 |
| Final set (minutes) | 17 | 19 | 12 | 7 | 11 | 22 | 13 | 15 | 7.5 | 6.5 |
| Compressive strength at 6 h (MPa) | 3.6 | 3.4 | 2.9 | 1.8 | 4.5 | 3.3 | 2.4 | 4.7 | 1.7 | 2.3 |
| Compressive strength at 1 d (MPa) | 20.1 | 19.2 | 19.9 | 15.4 | 28.1 | 25 | 16.1 | 27.6 | 4.6 | 6.3 |
| Compressive strength at 7 d (MPa) | 43.8 | 44.8 | 44.6 | 31 | 47.6 | 46 | 29.8 | 45.9 | 37.6 | 43.5 |
| Dosage, % ** | 9 | 9 | 9 | 9 | 9 | 9 | 9 | 9 | 8 | 8 |

TABLE 7

| Examples | E-39 | E-40 | E-41 | E-42 | E-43 | E-44 | E-45 | E-46 | E-47 | E-48 |
|---|---|---|---|---|---|---|---|---|---|---|
| Formulation/ | F-4(I) | F-13(I) | F-14(I) | F-15(I) | F-16(I) | F-16(I) | F-17(I) | F-17(I) | F-18(I) | F-8(C) |
| Mortar | M-1 | M-1 | M-4 | M-4 | M-4 | M-6 | M-3 | M-5 | M-5 | M-1 |
| Initial set (minutes) | 3 | 3.5 | 4.5 | 1.5 | 2 | 2 | 2 | 3.5 | 2.5 | 5.5 |
| Final set (minutes) | 14 | 7 | 38 | 30 | 40 | 14 | 18 | 21 | 20 | 18 |
| Compressive strength at 6 h (MPa) | 2 | 2.7 | 3 | 1 | 0.6 | 1 | 0.8 | 1.7 | 1.1 | 1.5 |
| Compressive strength at 1 d (MPa) | 13.9 | 10.2 | 30.4 | 28.3 | 25.8 | 20.1 | 12.7 | 21.8 | 19.9 | 8.5 |
| Compressive strength at 7 d (MPa) | 41.9 | 44.9 | 48 | 42.4 | 44.1 | 42.7 | 33.3 | 38.7 | 36.3 | 39.2 |
| Dosage, % ** | 8 | 8 | 8 | 8 | 8 | 8 | 8 | 8 | 8 | 8 |

| Examples | E-49 | E-50 | E-51 | E-52 | E-53 | E-54 | E-55 | E-56 |
|---|---|---|---|---|---|---|---|---|
| Formulation/ | F-9(C) | F-10(C) | F-11(C) | F-12(C) | F-12(C) | F-13(C) | F-13(C) | F-14(C) |
| Mortar | M-1 | M-4 | M-4 | M-4 | M-6 | M-3 | M-5 | M-5 |
| Initial set (minutes) | 4.5 | 3 | 1.5 | 5 | 1.5 | 5 | 3 | 1.5 |

TABLE 7-continued

| | | | | | | | | |
|---|---|---|---|---|---|---|---|---|
| Final set (minutes) | 14 | 47 | 38 | 51 | 18 | 26 | 28 | 24 |
| Compressive strength at 6 h (MPa) | 2.1 | 1.3 | 0.6 | 0.3 | 1 | 0.2 | 1.4 | 1.2 |
| Compressive strength at 1 d (MPa) | 5.8 | 29.1 | 27.1 | 23.9 | 18 | 8.5 | 20.3 | 20.4 |
| Compressive strength at 7 d (MPa) | 35.7 | 47.3 | 39.5 | 35.3 | 43.7 | 19.7 | 37.8 | 38.5 |
| Dosage, % ** | 8 | 8 | 8 | 8 | 8 | 8 | 8 | 8 |

** The dosage of formulations is in weight percent with respect to the amount of cement in the mortar.

TABLE 8

| Examples Formulation/ Concrete Dosage, %## | E-57 F-4(I) Con-1 8 | E-58 F-4(C) Con-1 8 |
|---|---|---|
| Compressive strength, N/mm² | | |
| 6 min | Meyco ® Needle | 0.43 | 0.19 |
| 15 min | Meyco ® Needle | 0.46 | 0.31 |
| 30 min | Meyco ® Needle | 0.58 | 0.57 |
| 1 h | Meyco ® Needle | 0.82 | 0.7 |
| 4 h | Hilti ® Nail Gun | 3.19 | 2.28 |
| 6 h | Hilti ® Nail Gun | 3.73 | 3.28 |
| 24 h | Hilti ® Nail Gun | 11.4 | 8.56 |
| 7 days | Bohrkern | 30.2 | 27.8 |
| 28 days | Bohrkern | 38.5 | 34 |

The dosage of formulations is in weight percent with respect to the amount of cement in the concrete.

The invention claimed is:

1. Accelerator mixture which contains
   (a) aluminium in oxidation state 3
   (b) sulphate
   (c) hexafluorosilicic acid and
   (d) an amine.

2. Accelerator according to claim 1, wherein the mixture is liquid, optionally an aqueous mixture.

3. Accelerator according to claim 1, wherein the mixture contains at least one alkanolamine.

4. Accelerator according to claim 1, wherein the mixture contains alkylene diamine.

5. Accelerator mixture which contains
   (a) aluminium in oxidation state 3
   (b) sulphate and
   (c) hexafluorosilicic acid,
   wherein the mixture is liquid, optionally an aqueous mixture, and wherein the mixture contains magnesium silicate, clay mineral, kaolin, phosphoric acid, phosphorous acid, organic carboxylic acid and/or allophane as a stabiliser (e).

6. Accelerator mixture which contains
   (i) aluminium in oxidation state 3
   (ii) sulphate and
   (iii) hexafluorosilicic acid,
   wherein the mixture is liquid, optionally an aqueous mixture, and wherein the mixture contains:
   (a) between 2.7 and 10% by weight of aluminium in oxidation state 3,
   (b) between 12 and 34% by weight of sulphate,
   (c) between 0.05 and 20% by weight of hexafluorosilicic acid,
   based in each case on the total weight of the aqueous mixture.

7. Accelerator according to claim 6, wherein the mixture contains:
   (a) between 5 and 9% by weight of aluminium in oxidation state 3,
   (b) between 16 and 30% by weight of sulphate,
   (c) between 0.2 and 10% by weight of hexafluorosilicic acid,
   based in each case on the total weight of the aqueous mixture.

8. Accelerator according to claim 6, wherein the hexafluorosilicic acid is present in a proportion of between 0.1 and 10% by weight in the aqueous mixture.

9. Accelerator according to claim 6, wherein the mixture is present in the form of a solution or a dispersion.

10. Accelerator according to claim 6, wherein the mixture contains between 14 and 34% by weight of sulphate, based on the total weight of the aqueous mixture.

11. Accelerator according to claim 6, wherein the mixture contains between 0.1 and 20% by weight of hexafluorosilicic acid, based on the total weight of the aqueous mixture.

12. Accelerator according to claim 7, wherein the mixture contains between 18 and 30% by weight of sulphate, based on the total weight of the aqueous mixture.

13. Process for the preparation of a liquid accelerator, wherein
   (i) aluminium sulphate and/or aluminium hydroxy sulphate, optionally also aluminium hydroxide, wherein the aluminium hydroxide is optionally amorphous aluminium hydroxide, and
   (ii) hexafluorosilicic acid
   are mixed with water to form a mixture, wherein the liquid accelerator contains aluminium in oxidation state 3, the mixture comprising at least one of the following:
   wherein the mixture contains an amine;
   wherein the mixture contains at least one alkanolamine;
   wherein the mixture contains alkylene diamine;
   wherein the mixture contains magnesium silicate, clay mineral, kaolin, phosphoric acid, phosphorous acid, organic carboxylic acid and/or allophane as a stabiliser;
   wherein the mixture contains between 2.7 and 10% by weight of aluminium in oxidation state 3; between 12 and 34% by weight of sulphate; between 0.05 and 20% by weight of hexafluorosilicic acid, based in each case on the total weight of the aqueous mixture; or
   wherein the mixture contains between 5 and 9% by weight of aluminium in oxidation state 3; between 16 and 30% by weight of sulphate; between 0.2 and 10% by weight of hexafluorosilicic acid, based in each case on the total weight of the aqueous mixture.

14. Process according to claim 13, wherein the mixture contains between 14 and 34% by weight of sulphate, based on the total weight of the aqueous mixture.

15. Process according to claim 13, wherein the mixture contains between 0.1 and 20% by weight of hexafluorosilicic acid, based on the total weight of the aqueous mixture.

16. Process according to claim 13, wherein the mixture contains between 18 and 30% by weight of sulphate, based on the total weight of the aqueous mixture.

17. Process according to claim 13, wherein the mixture contains between 0.1 and 10% by weight of hexafluorosilicic acid, based on the total weight of the aqueous mixture.

18. Process for the coating of substrates with concrete or mortar comprising applying the concrete or mortar to the substrate, optionally by spraying, wherein the hardening of the concrete or mortar is forced with an accelerator mixture which contains
  (a) aluminium in oxidation state 3
  (b) sulphate and
  (c) hexafluorosilicic acid.

19. Concrete or mortar containing an accelerator mixture which contains
  (a) aluminium in oxidation state 3
  (b) sulphate and
  (c) hexafluorosilicic acid.

20. Hardened layer which was produced by applying concrete or mortar to a substrate, the hardening of which was forced with an accelerator mixture which contains
  (a) aluminium in oxidation state 3
  (b) sulphate and
  (c) hexafluorosilicic acid.

* * * * *